United States Patent [19]
Hurlocker

[11] Patent Number: 5,490,142
[45] Date of Patent: Feb. 6, 1996

[54] VT GROUP OPTICAL EXTENSION INTERFACE AND VT GROUP OPTICAL EXTENSION FORMAT METHOD

[75] Inventor: Claude M. Hurlocker, Raleigh, N.C.

[73] Assignee: Alcatel Network Systems, Inc., Richardson, Tex.

[21] Appl. No.: 316,130

[22] Filed: Sep. 30, 1994

[51] Int. Cl.⁶ ....................................................... H04J 3/00
[52] U.S. Cl. ............................. 370/84; 370/94.2; 370/99; 359/135
[58] Field of Search ................................. 370/110.1, 99, 370/84, 102, 94.1, 94.2; 359/135

[56] References Cited

U.S. PATENT DOCUMENTS

| | | | |
|---|---|---|---|
| 5,033,044 | 7/1991 | Williams et al. | 370/110.1 |
| 5,161,152 | 11/1992 | Czerwiec et al. | 370/84 |
| 5,287,513 | 2/1994 | Ferguson | 370/100.1 |
| 5,291,485 | 3/1994 | Afify et al. | 370/99 |
| 5,315,594 | 5/1994 | Noser | 370/110.1 |

Primary Examiner—Douglas W. Olms
Assistant Examiner—Min Jung
Attorney, Agent, or Firm—Ware, Fressola, Van Der Sluys & Adolphson

[57] ABSTRACT

A VT group optical extension format (FIGS. 7 and 8) defines a transport frame for the transfer of 135 bytes, each byte comprising 8 bits, the format providing a line rate of 8.640 Mbit/S. Each frame comprises a transport overhead portion and a payload portion. The transport overhead portion is comprised of 27 bytes and defines various operations, administration and maintenance functions, whereas the payload portion is comprised of 108 bytes which directly correspond to one VT group of an STS-N frame (FIG. 1). The VT group optical extension format line rate is determined as an integer multiple (i) of an STS-N network element clock where i is 6 if N is 1 and i is 18 if N is 3. An optical extension interface (172) is provided between a VTG bus (140) and an optical extension (178), the interface (172) being responsive to the provision of a multiplexed VT group payload provided on the VTG bus (140) for providing a corresponding VT group optical extension transport frame on the optical extension (178), the interface (172) being further responsive to the provision of a VT group optical extension transport frame on the optical extension (178) for providing a multiplexed VT group payload and associated path overhead to the VTG bus(140).

19 Claims, 8 Drawing Sheets

| OPTICAL VT GROUP TRANSPORT OVERHEAD | VT GROUP | | | |
|---|---|---|---|---|
| ROW # | | | | |
| 1 A1 | | | | |
| 2 A2 | | | | |
| 3 J1 TRACE | | | | |
| 4 H4 | | | | |
| 5 ORDERWIRE | | | | |
| 6 USER CHANNEL | | | | |
| 7 DCC | | | | |
| 8 DCC | | | | |
| 9 DCC | | | | |
| 10 BIP-8 | | | | |
| 11 K1 | | | | |
| 12 K2 | | | | |
| 13 SYNC | | | | |
| 14 SIGNAL LABEL | | | | |
| 15 PATH STATUS | | | | |
| 16 GROWTH | | | | |
| 17 GROWTH | | | | |
| 18 GROWTH | | | | |
| 19 GROWTH | | | | |
| 20 GROWTH | | | | |
| 21 GROWTH | | | | |
| 22 GROWTH | | | | |
| 23 GROWTH | | | | |
| 24 GROWTH | | | | |
| 25 GROWTH | | | | |
| 26 GROWTH | | | | |
| 27 GROWTH | | | | |

| COL-UMN ROW | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| 1 | A1 FRAME | | | | | A2 FRAME | | | | | J1 TRACE | | | | |
| 2 | H4 INDICATE | | | | | E1 O'WIRE | | | | | F1 USER | | | | |
| 3 | D1 DCC | | | | | D2 DCC | | | | | D3 DCC | | | | |
| 4 | B2 BIP | | | | | K1 APS | | | | | K2 APS | | | | |
| 5 | S1 SYNC | | | | | C2 S LABEL | | | | | G1 STATUS | | | | |
| 6 | Z1 GROWTH | | | | | Z2 GROWTH | | | | | Z3 GROWTH | | | | |
| 7 | Z4 GROWTH | | | | | Z5 GROWTH | | | | | Z6 GROWTH | | | | |
| 8 | Z7 GROWTH | | | | | Z8 GROWTH | | | | | Z9 GROWTH | | | | |
| 9 | Z10 GROWTH | | | | | Z11 GROWTH | | | | | Z12 GROWTH | | | | |

Columns 2–5, 7–10, 12–15: VT GROUP PAYLOAD

FIGURE 8

VT GROUP OPTICAL EXTENSION INTERFACE AND VT GROUP OPTICAL EXTENSION FORMAT METHOD

TECHNICAL FIELD

The present invention relates to telecommunications and, more particularly, to a format and line rate for a SONET VT Group optical extension interface.

BACKGROUND OF THE INVENTION

An optical carrier (fiber optic) transmission medium such as the optical carrier medium operating within the synchronous optical network (SONET) standard adopted by the American National Standards Institute, Inc. (ANSI) as set forth in their Standard Number TI.105-1988 entitled "Digital Hierarchy Optical Interface Rates and Formats Specification" is increasingly being accepted for the communication of many forms of digital signals. According to the SONET standard, an optical carrier level (such as OC-1, OC-3, OC-12, OC-48) is the signal that results from an optical conversion of an electrical synchronous transport signal (STS) operating at the same level. The STS-1 (STS level one) is defined as the basic SONET building block signal with a transfer rate of 51.840 megabits per second (Mbit/s).

An optical carrier is typically used to carry high speed optical signals, e.g., an OC-3 channel operating at 155.52 Mbit/s, and typically over long distances. At various locations along the optical carrier, interfaces may be provided for interfacing electrical (digital) signals lines, e.g., DS-1, DS-3, with the optical carrier. At the interface between the optical signal line and the digital signal line, a known type of add/drop multiplexer (ADM) may be provided which allows multiple functions such as the manipulation of circuits at the DS-1 and DS-3 levels through a variety of low speed interfaces. The low speed and lower level signals can ultimately be used to connect with system end users.

In certain applications, it may be desirable to provide the optical carrier with an interface with an optical extension (intermediate optical fiber signal bus) before breaking down the signal into the lower level electronic signals. Such an optical extension could be used to provide a signal transmission path for optical signals from the interface with the OC-N/STS-N optical signal bus and a remote location. This would allow the continued transmission benefits associated with SONET signal transmission to the remote location. However, within such an interface, there is a need to provide a transport frame format and line rate for transmitting optical signals on such an optical extension. One possible method would be to use the digital signal standard, or DS-X standard, for the transmission of such signals. However, such a standard does not provide the extensive operations, administration and maintenance (OAM) capabilities of the SONET standard.

DISCLOSURE OF THE INVENTION

Objects of the invention include the provision of a transport frame format for a VT group optical extension which provides extensive operations, administration and maintenance capabilities of the type provided in the SONET standard.

Another object of the present invention is to provide a transport frame format and line rate for a VT group optical extension which includes a sufficient amount of bandwidth to support a VT group transport overhead which is analogous to the overhead already defined for the SONET standard and which also provides sufficient bandwidth for growth as new overhead functions are defined.

A still further object of the present invention is to provide a transport frame format for a VT group optical extension which operates at a line rate which may be easily produced from the standard SONET format line rate.

A still further object of the present invention is to provide a transport frame format for a VT group optical extension having a payload capacity which can carry a VT group payload from a SONET, synchronous payload envelope (SPE) exactly as it is transported by other SONET interfaces.

Another object of the present invention is to provide an optical extension interface for interfacing a VT group (VTG) bus with an optical extension which provides a transport frame format for signals being provided to the optical extension and which provides a multiplexed VT payload and associated path overhead for signals being provided to the VTG bus.

According to the present invention, a VT group optical extension format defines a transport frame for the transfer of 135 bytes, each byte comprising 8 bits, the format providing a line rate of 8.640 Mbit/S.

In further accord with the present invention, each frame comprises a transport overhead portion and a payload portion. The transport overhead portion is comprised of 27 bytes and defines various operations, administration and maintenance functions, whereas the payload portion is comprised of 108 bytes which directly correspond to one VT group of an STS-N frame.

In still further accord with the present invention, the VT group optical extension format line rate is determined as an integer multiple (i) of an STS-N network element clock where i is 6 if N is 1 and i is 18 if N is 3.

According still further to the present invention, an optical extension interface is provided between a VTG bus and an optical extension, the interface being responsive to the provision of a multiplexed VT group payload provided on the VTG bus for providing a corresponding VT group optical extension transport frame on the optical extension, the interface being further responsive to the provision of a VT group optical extension transport frame on the optical extension for providing a multiplexed VT group payload and associated path overhead to the VTG bus.

In still further accord with the present invention, the optical extension interface determines the line rate of the optical extension based on timing signals received from a drop module interface (DMI).

In still further accord with the present invention, the DMI determines the optical extension line rate as an integer multiple (i) of an STS-N network element clock where i is 6 if N is 1 and i is 18 if N is 3.

The present invention provides a superior transport frame format for the transmission of VT group data on an optical extension, the format being as synergistic as possible with the current STS-N/OC-N interfaces in both format and behavior. The format of the invention simplifies the standardization activities necessary to adopt a format for a VT group optical extension interface, minimizes unnecessary new and changed overhead definitions and behaviors for such an interface, and maximizes the synergy of this interface with respect to existing STS-N/OC-N standards. The format and overhead of the present invention is analogous to the existing STS-N/OC-N format and overhead to minimize the number of new format and overhead related issues which must be addressed for the standardization of a VT group optical extension interface. Such defined capabilities will allow the introduction of VT group optical extension interfaces within a SONET network while preserving the current investment in training, network architectures, and OAM applications.

The foregoing and other objects, features and advantages of the present invention will become more apparent in light of the following detailed description of exemplary embodiments thereof in view of the accompanying drawings.

BEST MODE FOR CARRYING OUT THE INVENTION

The present invention is particularly well suited for providing a transport frame format for the transmission of optical signals on a VT group optical extension. The transport frame format is provided by an optical extension interface which may be part of a SONET system add/drop multiplexer (ADM). The optical extension provides for the transmission of VT group signals optically to remote locations within the transport frame format of the invention. Additionally, the transport frame format provides the desired operations, administration and maintenance capabilities of the type provided in the SONET standard.

Figure 1:
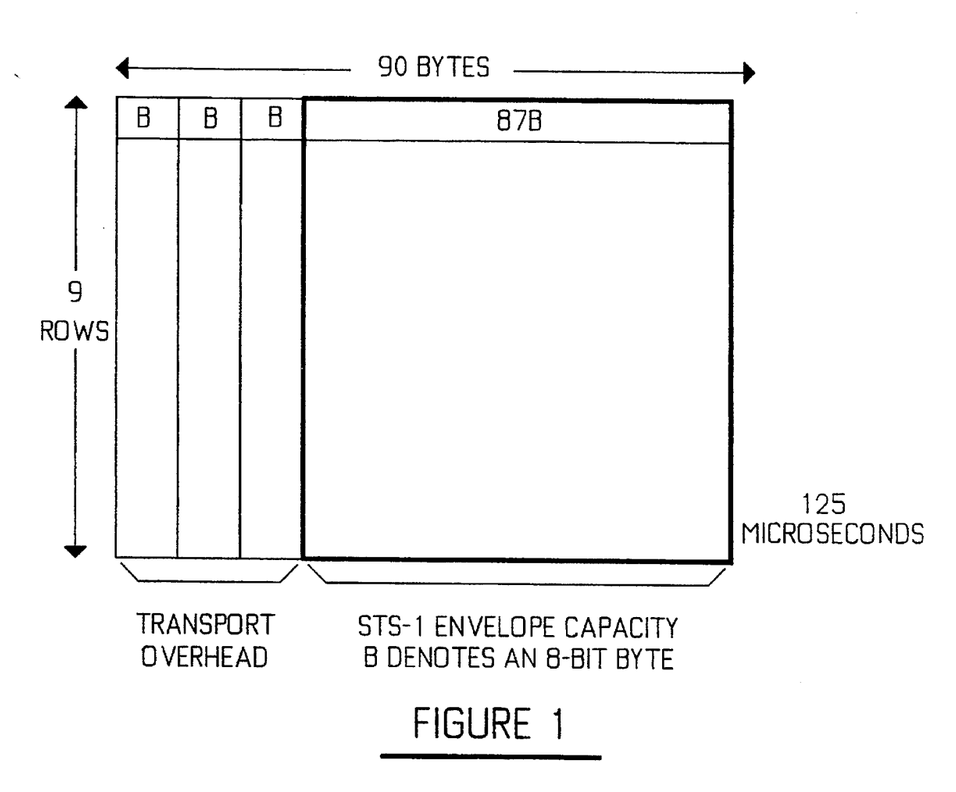
FIG. 1 is a diagram showing the frame format for a synchronous transport signal frame, specifically an STS-1 frame illustrating both transport overhead and envelope capacity.

The present invention is intended for use with an optical carrier (fiber optic) transmission medium such as an optical carrier medium operating within the above described synchronous optical network (SONET) standard. As described hereinabove, an optical carrier level (such as OC-1, OC-3, OC-12, OC-48) is the signal that results from an optical conversion of a synchronous transport signal (STS) operating at the same level. The STS-1 (STS level one) is defined as the basic building block signal with a transfer rate of 51.840 megabits per second (Mbit/s). Thus, an STS-N optical carrier level is simply a level one rate multiplied by N, where N is an integer equal to or greater than one. The STS bitstream is presented in a frame where the STS-1 frame comprises 810 bytes which can be visualized as nine (9) rows, each row 90 bytes wide (90 columns) as illustrated in FIG. 1, with the frame period equal to 125 microseconds. The order of transmission is row by row, from left to right. Within each byte, the most significant bit is transmitted first.

An STS-1 frame can be divided into a portion that is assigned for transport overhead and a portion known as a synchronized payload envelope (SPE) that contains path overhead and payload. Many different types of overhead are defined for an STS-1 frame including overhead for maintenance, user channels, frequency justification, orderwire, channel identification and growth channels. The first three columns of the STS frame comprise the transport overhead, which in turn comprises section and line overhead. Section overhead deals with the SONET section layer which is directed to the transport of STS-N frames across the physical medium. The line overhead deals with the line layer which is directed to the transport of path layer payload.

Figure 2:
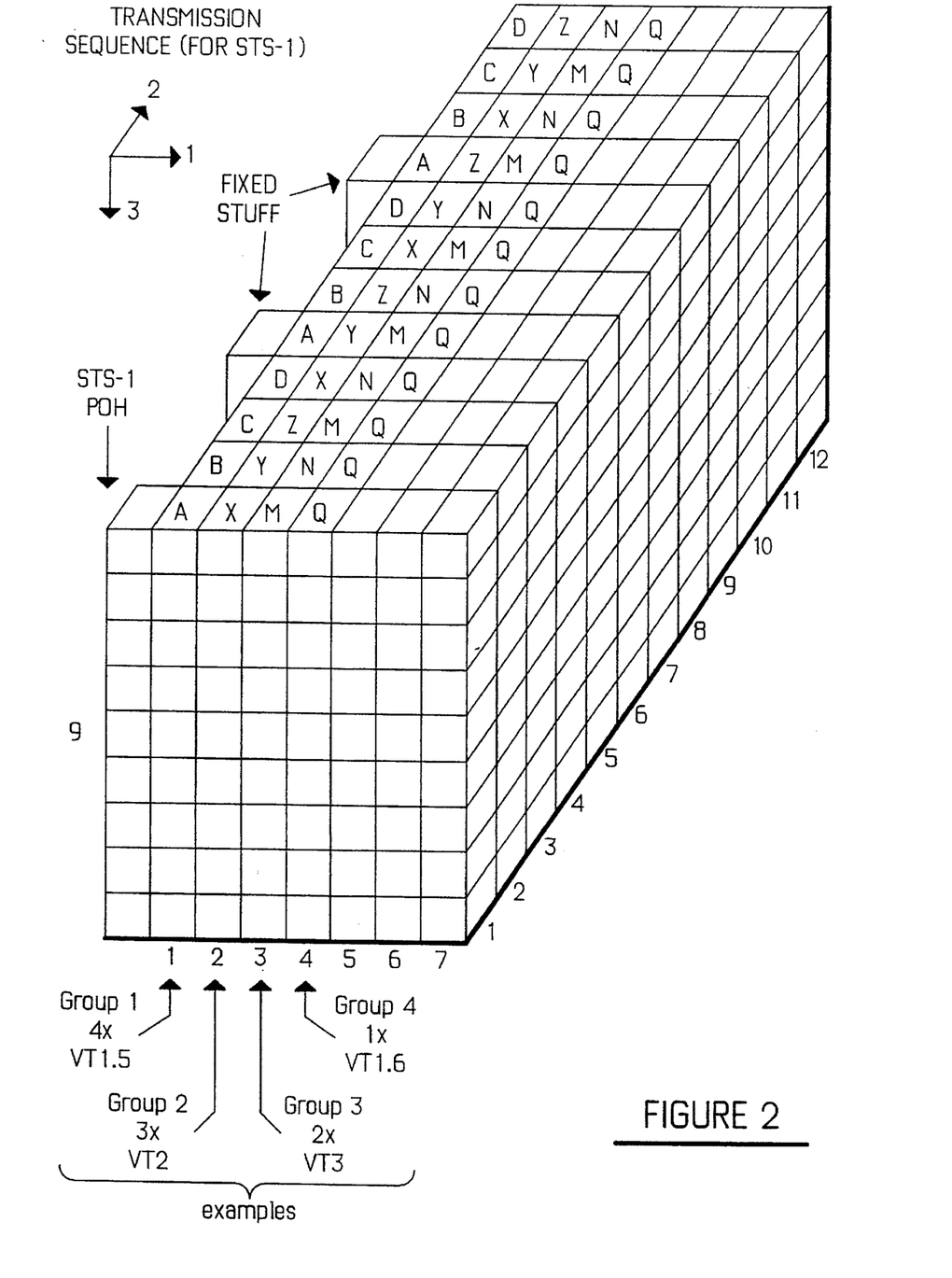
FIG. 2 is a diagram showing the frame column assignment for VT groups within the STS-1 frame of FIG. 1.

The synchronous payload envelope (SPE) of an STS-1 frame consists of nine (9) rows, each eighty-seven (87) columns wide as shown in FIG. 1. The first column contains path overhead leaving 774 bytes available for payload. It is within this payload that channels of telephonic information, comprising channels conforming to various digital standards, are contained. As is known in the art, these standards include DS-0 (64 kbit/s), DS-1 (1.544 Mbit/s) and DS-3 (44.736 Mbit/s). The payload portion may be used to transport DS-3 signals or to transport a variety of Sub-DS-3 signals. To maintain a consistent payload structure while providing for transport of a variety of lower rate services, such as DS-1, DS-1C, and DS-2, a structure called a virtual tributary (VT) is defined for the SPE. For purposes of transporting such Sub-DS-3 signals, the SPE is divided into seven VT groups, each having a total of 108 bytes within each VT group. The column assignments of an STS-1 signal per VT group are shown in FIG. 2. Each STS-1 frame is transmitted serially at a rate of 51.84 Mbit/s while each of the seven VT groups are transmitted serially at a rate of 6.912 Mbit/s. The VT group structure is designed to facilitate consistent transport and switching of various payloads uniformly by handling only VT's. All services below the DS-3 rate are transported within a VT group structure.

There are four types of VT signals which may be carried in one of the VT groups: The VT 1.5 (1.728 Mbit/s), the VT 2 (2.304 Mbit/s), the VT 3 (3.456 Mbit/s) and the VT 6 (6.912 Mbit/s). All VT signals within a VT group must be of the same type, but VT groups within a single SPE can be different types. Each VT group may carry four (4) VT 1.5, three (3) VT 2.0, two (2) VT 3.0 or one (1) VT 6.0 signal.

Figure 3:
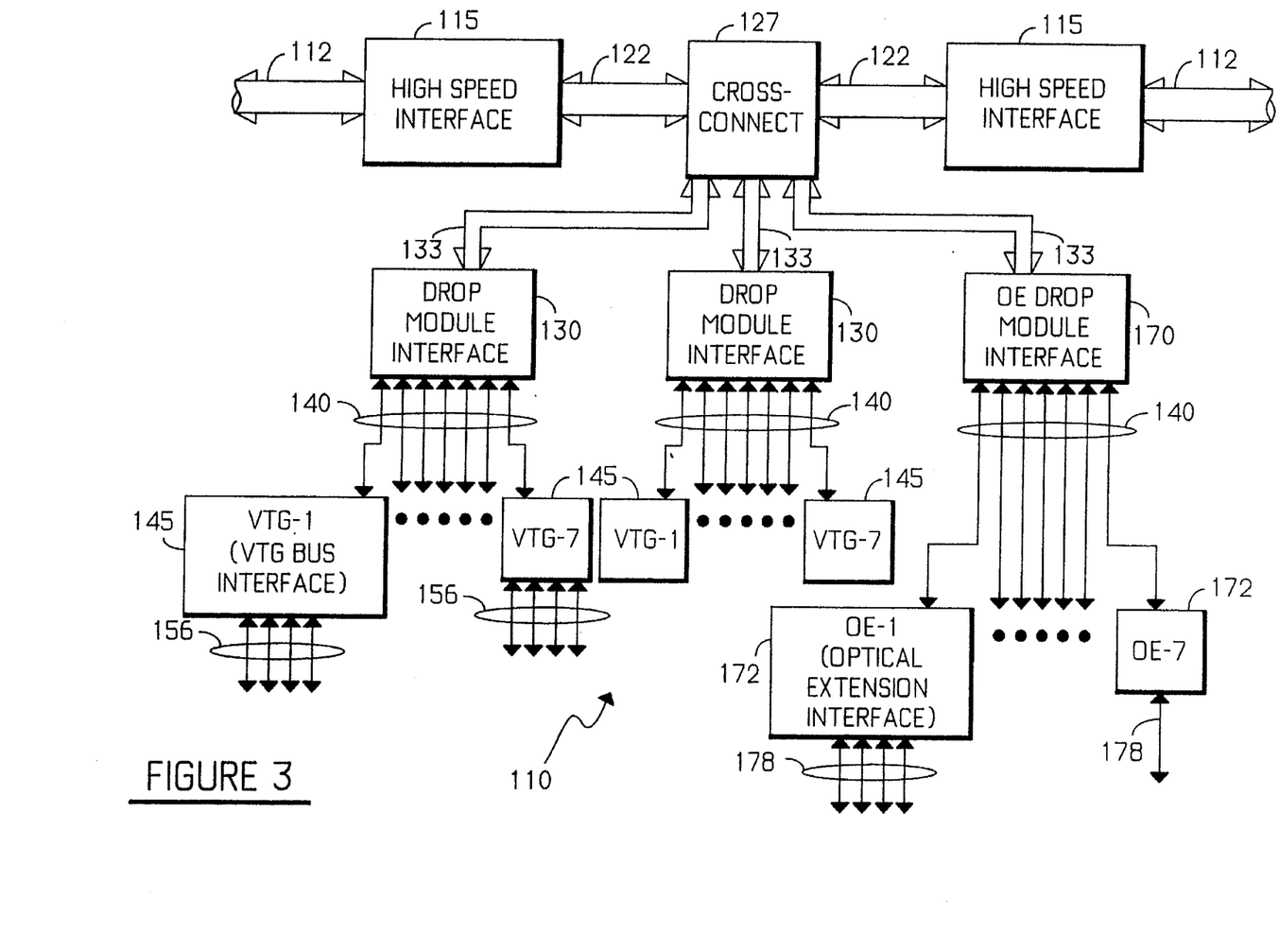
FIG. 3 is a schematic block diagram showing an add/drop multiplexer (ADM) having an optical extension interface and drop module interface of the present invention.

Referring to FIG. 3, an add/drop multiplexer (ADM) 110 is illustrated having the optical extension interface of the present invention. The ADM 110 is shown interconnected between optical carriers 112 each having an optical channel which operates for example at the optical carrier level-3 (OC-3) line rate of 155.52 Mbit/s. The optical signals are provided on the optical signal lines 112 to a high speed optical interface (HIF) 115 within the ADM 110. Each high speed interface 115 comprises an optical to electrical receiver for converting received optical signals into electrical STS-3 signals and also an electrical to optical transmitter for converting STS-3 electrical signals into OC-3 optical signals for transmission on the optical signal lines 112. The output of the receiver is provided to, and the input of the transmitter is received from, a high speed multiplexer-demultiplexer (not shown) within each of the high speed interfaces. The multiplexer-demultiplexer converts the STS-3 signal into three (3) STS-1 signals in the demultiplex direction, and converts three (3) STS-1 signals into one (1)

STS-3 signal in the multiplex direction. The three STS-1 path signals are provided to and received from signal lines 122.

The signal lines 122 interconnect the HIF 115 with a cross connect 127. The cross connect 127 provides a variable, i.e., software provisionable, cross connect capability between the two high speed interfaces 115, and/or between a high speed interface 115 and one or more drop module interfaces DMI 130 via signal lines 133. Each DMI 130 provides an interface between low speed facilities, i.e., synchronous digital signal level 1 (DS-1) traffic, and the synchronous transport signal level 1 (STS-1) group bus. The output of the drop module interface 130 is provided via a virtual tributary group (VTG) bus 140 to a plurality of VTG bus interface units 145. In the example of the present invention, each DMI 130 is shown interconnected to seven VTG bus interface units 145. The operation of the DMI 130 will be described in greater detail hereinafter.

Each VTG bus interface 145 supports up to four digital signal level 1 (DS-1) circuits 156. The VTG interface units provide a synchronous mapping with a floating VT pointer of VT signals to a VT group. The VTG interface unit performs DS-1 to VT group mapping in the MUX direction and VT group to DS-1 mapping in the DEMUX direction. The DS-1 circuits 156 may be interconnected to end users (not shown) for the transmission of signals from or to the optical signal lines 112.

All of the apparatus described thus far is simply exemplary of that which is well known to the art.

In accordance with the present invention, it may be desirable to provide for the optical transmission of lower rate services, e.g., a DS-1, to a remote location from the ADM 110 interface. Therefore, an optical extension drop module interface (OEDMI) 170 is provided for interconnection with an optical extension interface (OEI) 172 via an electrical VTG bus 140. The OEI 172 provides an interface between the electrical VTG bus 140 and an optical extension (OE) optical fiber signal bus 178.

Figure 4:
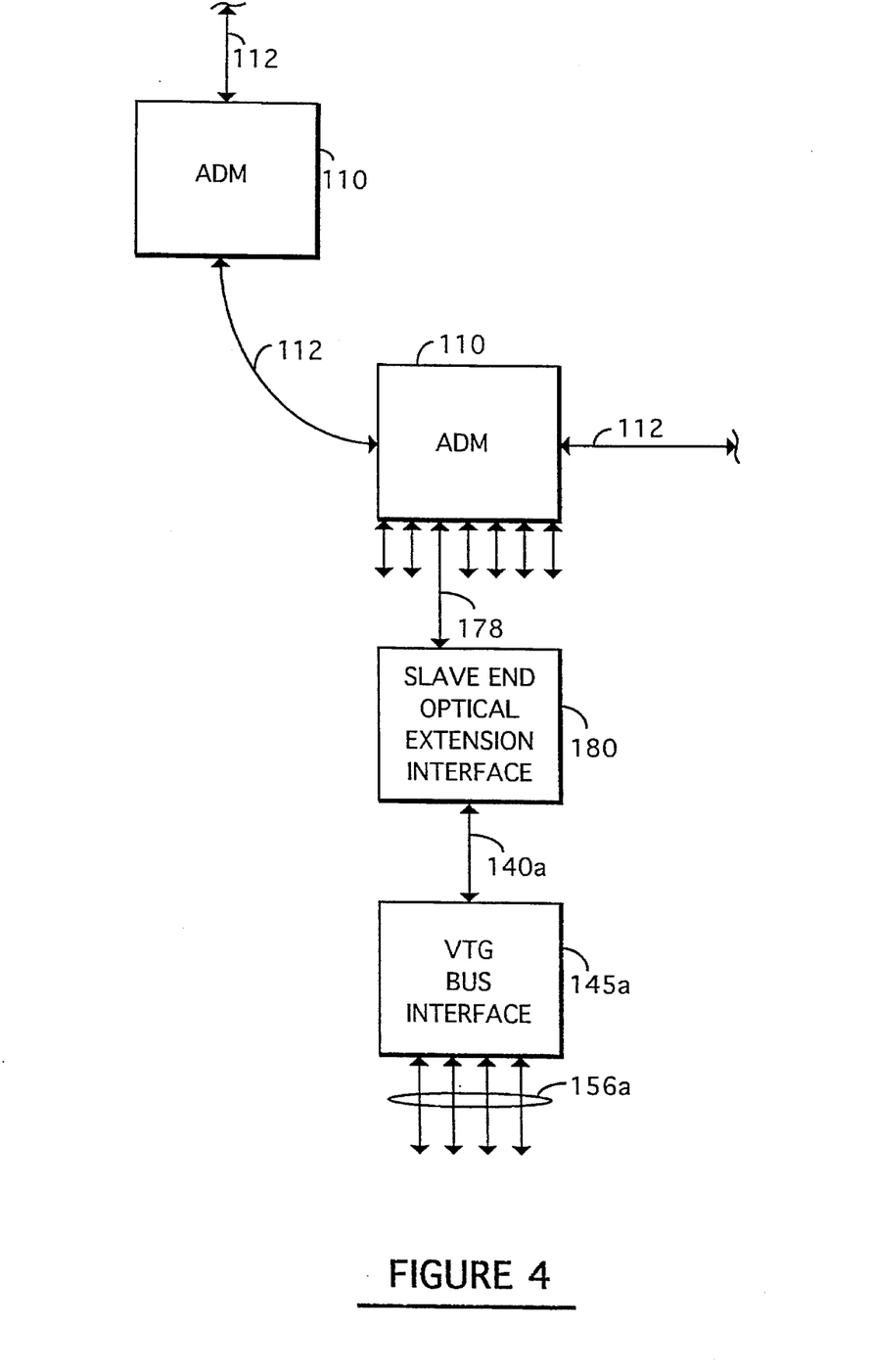
FIG. 4 is a schematic block diagram showing an optical extension of the present invention as part of a SONET communication system.

Referring to FIG. 4, an example showing the optical extension 178 of FIG. 3 interconnected between the ADM 110 of FIG. 3 and a slave optical extension interface (Slave OEI) 180 is shown. A second ADM 110 is shown interconnected to the ADM 110 and other ADMs (not shown) by various lengths of optical signal line 112 in the network. The optical extension 178 is provided between the ADM 110 and the Slave OEI 180 for ultimately providing electronic signals to DS-1 circuits at a remote location. As will be understood from the above and as described in greater detail hereinafter, the ADM 110 of FIG. 4 includes the OEI 172 (FIG. 3) for providing an interface between the VTG bus 140 and one end of the optical extension 178, and a Slave OEI 180 is provided at the other end of the optical extension 178 for providing an interface between the optical extension 178 and four (4) DS-1 circuits 156a (via a VTG bus 140a and a VTG bus interface 145a).

Figure 5:
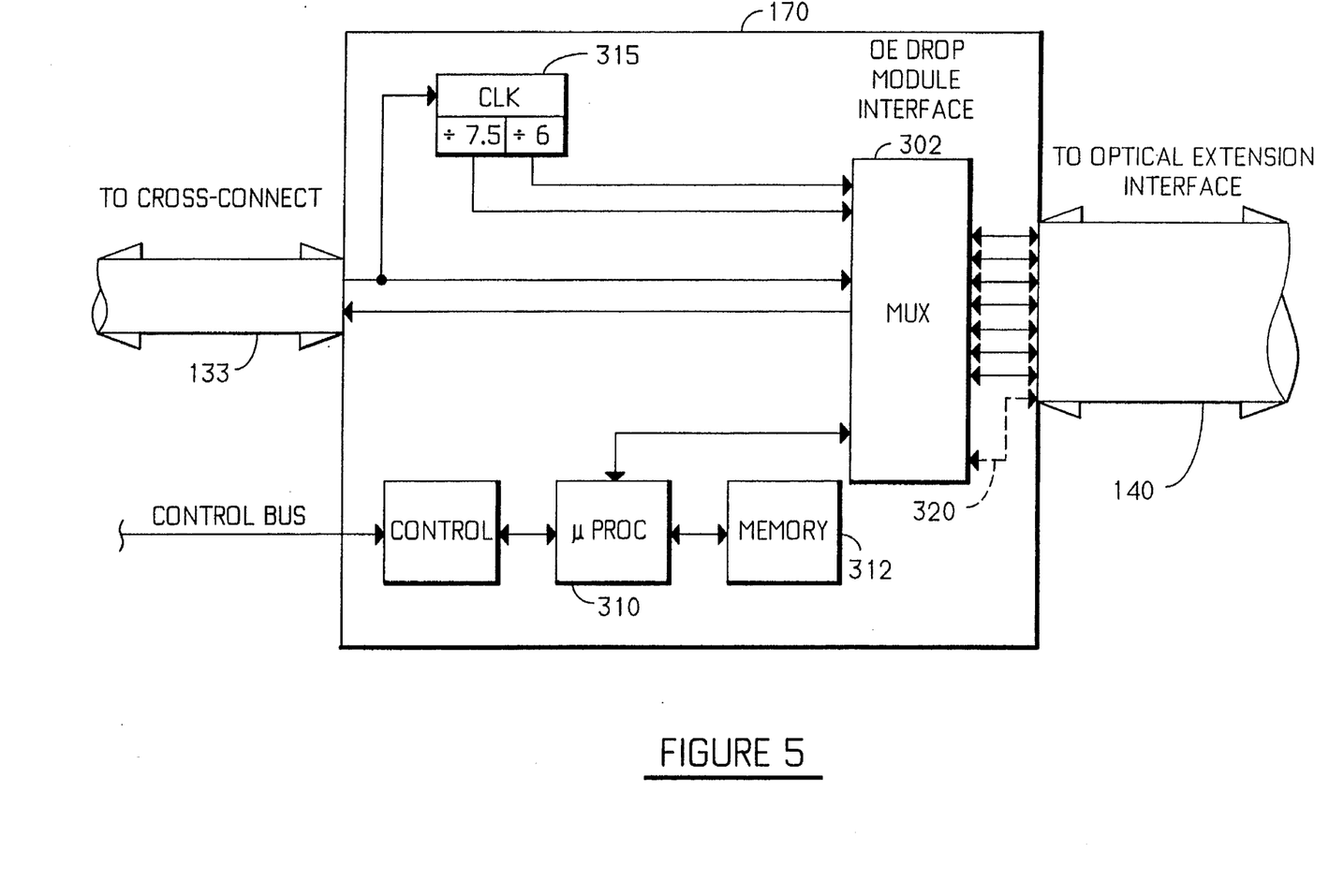
FIG. 5 is a schematic block diagram of a drop module interface (DMI) of FIG. 3.

Referring now to FIG. 5, the OEDMI 170 is shown in greater detail. The OEDMI 170 comprises a multiplexer/demultiplexer (MUX) 302 which demultiplexes signals provided on the STS-1 group bus 133 for provision to the VTG bus 140, and which also multiplexes signals received from the VTG bus 140 for provision to the STS-1 group bus 133. The MUX 302 is controlled by a micro-processor 310 which has a memory 312 which provides programming and data memory for the micro-processor 310. A timing control circuit (CLK) 315 provides the appropriate timing from the 51.840 Mbit/s STS-1 group bus line rate to the 6.912 Mbit/s line rate of the VTG bus. Additionally, the clock 315 provides a clock signal at a 8.640 Mbit/s rate which provides the optical extension line rate. This line rate is determined by division of the STS-1 group bus line rate by an integer multiple six (6).

In the example of the present invention, the OEDMI 170 of FIG. 3 is interconnected to seven optical extension interfaces 172 for interfacing each one of the seven VT groups of an STS-1 frame to each optical extension interface 172. Additionally, a VTG status and provisioning line 320 (FIG. 5) is provided within each of the VT group buses 140 to each optical extension interface 172 (FIG. 3) for providing control, alarm, and provisioning to/from the optical extension interface 172 (FIG. 3).

Figure 6:
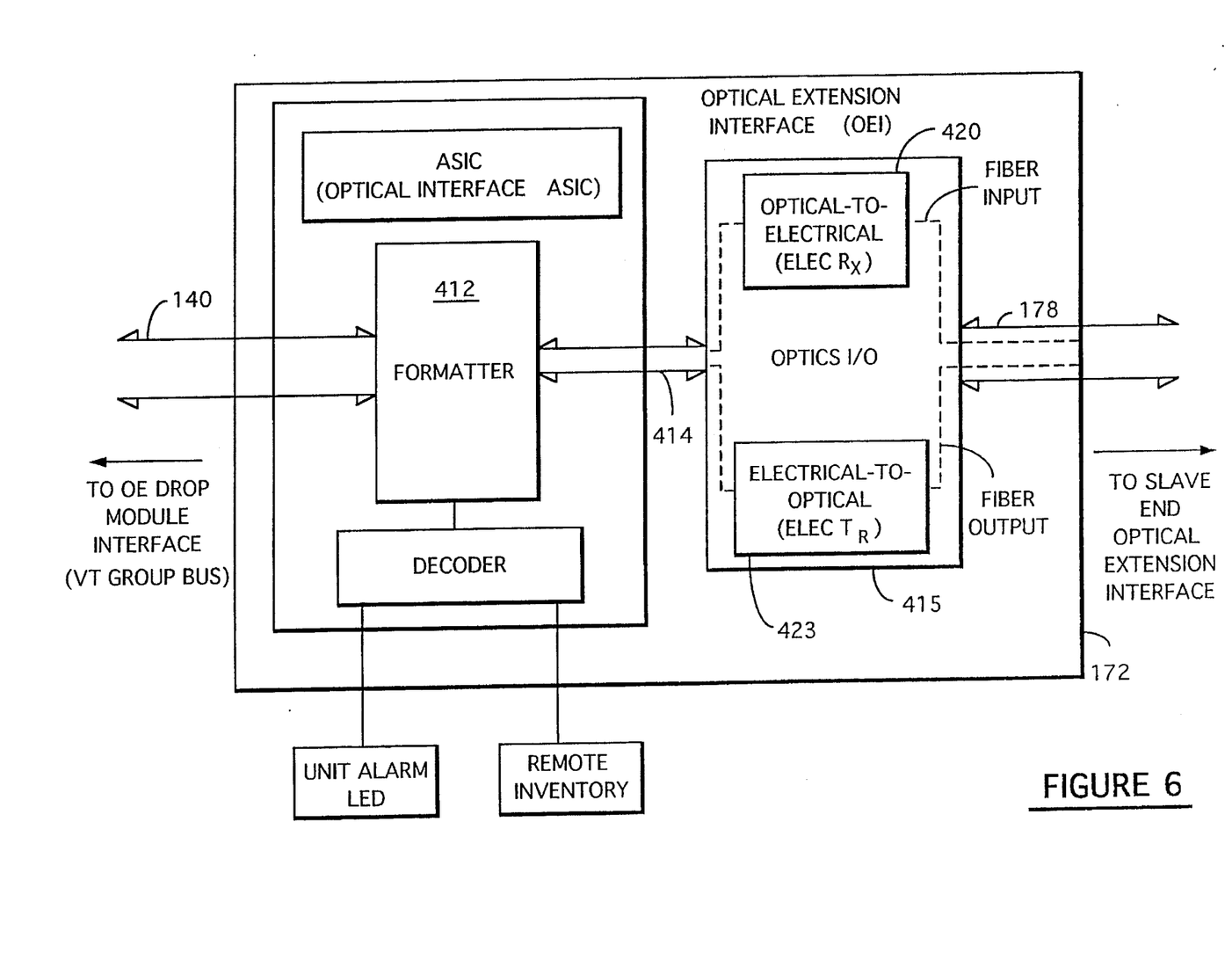
FIG. 6 is a schematic block diagram of an optical extension interface of FIG. 3.

Referring now to FIG. 6, the optical extension interface 172 of FIG. 3 performs VT group to optical extension format mapping in the MUX direction and optical extension format to VT group mapping in the DEMUX direction. The description of the OEI 172 of FIG. 6 relates to an OEI contained within an ADM. However, it will be understood by those skilled in the art that this description is equally applicable to a Slave OEI 180 (FIG. 4). The VT group data provided by the OEDMI of FIG. 3 is provided in the MUX direction on the VTG bus 140 to a VT group formatter 412 (FIG. 6) within the optical extension interface 172. The formatter 412, the function of which will be described in greater detail hereinafter, is a format generator for converting, in the MUX direction, the VT group data on the line 140 into data on a line 414 in the optical extension format of the present invention and, i the DEMUX direction, for converting data on the line 414 that is in the optical extension format into VT group data on the line 140. The formatter 412 may be implemented in an application specific integrated circuit (ASIC).

The formatter 412 is connected via an 8.640 Mbit/s signal rate to an optical input/output device (OPTICS I/O) 415. The OPTICS I/O provides an optical/electrical interface for interfacing the electrical signals provided by the formatter 412 with the optical extension bus 178. The OPTICS I/O includes an optical-to-electrical (electrical receiver) device 420 and an electrical-to-optical (electrical transmitter) device 423. The electrical receiver converts the optical signals received in the DEMUX direction from the optical extension 178 into electrical signals for provision to the formatter 412, and the electrical transmitter 423 converts the electrical signals provided in the MUX direction by the formatter 412 into optical signals for provision to the optical extension 178.

Figure 7:
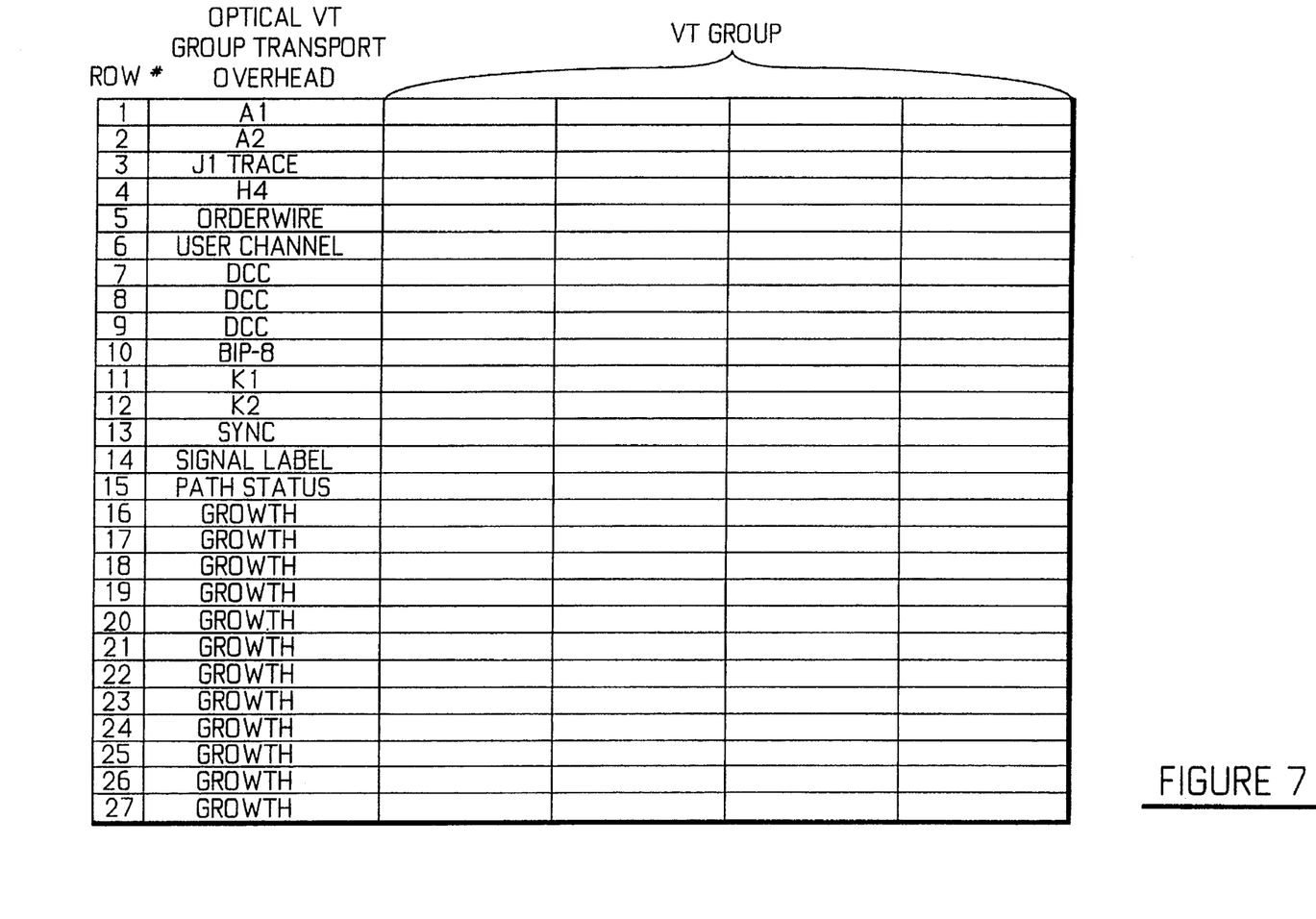
FIG. 7 is a diagram showing the frame format for a transport signal frame, specifically a VT group optical extension frame format of the present invention used on an optical extension.
Figure 8:
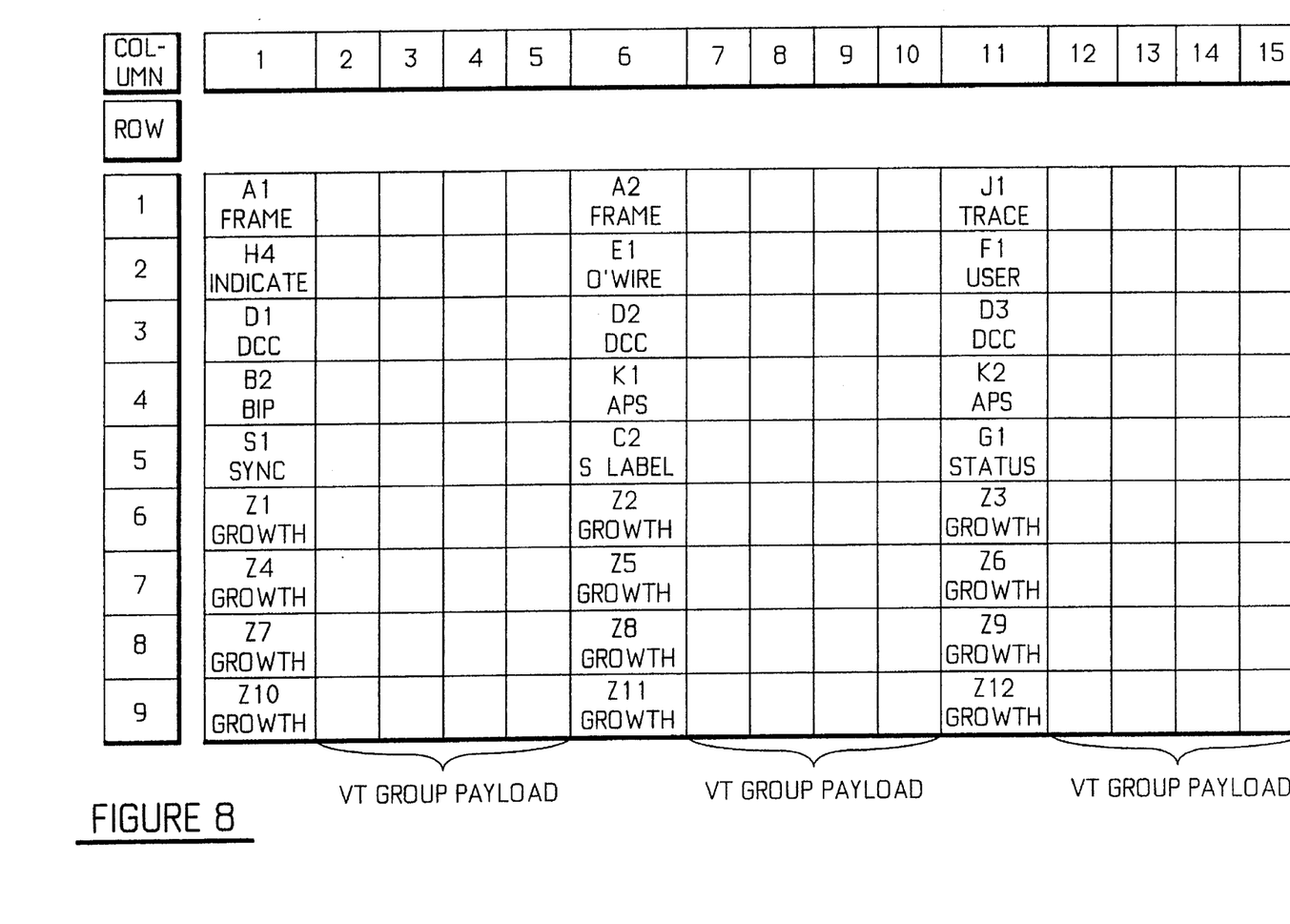
FIG. 8 is a diagram showing the VT group optical extension frame format of FIG. 7 in a nine row format.

As described hereinabove, the formatter 412 performs VT group to optical extension frame mapping in one (MUX) direction and optical extension frame to VT group mapping in the other (DEMUX) direction. FIGS. 7 and 8 show the optical extension frame format of the present invention. FIG. 7 shows the optical extension format comprising twenty-seven (27) rows and five (5) columns, and FIG. 8 shows the format in nine (9) rows and fifteen (15) columns to more closely resemble the nine row SONET format. Both of the diagrams of FIG. 7 and FIG. 8 are read from left to right and then from top to bottom. The optical extension format includes a frame comprised of 135 bytes with the basic signal broken down into two main portions, one portion for group transport overhead and one portion for payload. The group transport overhead comprises 27 bytes, and the payload contains one VT group of 108 bytes directly corresponding to one VT group of a SONET frame. As is known in the art, one VT group may comprise one VT-6, two VT-3's, three VT-2's or four VT1.5's.

The 27 bytes of group transport overhead are provided in the first column in the five (5) column format illustrated in FIG. 7 and is provided in the first, sixth and eleventh columns of the fifteen (15) column format of FIG. 8. For ease of description and understanding, the group transport overhead function will be described with respect to the first column of the five (5) column format illustrated in FIG. 7.

The VT group transport overhead is provided for operations, administration, and maintenance (OAM) of an end to end optical extension 178. OAM standardization is a requirement for mixing equipment for multiple vendors and ease of management of all levels of a system. The functional allocation of the 27 bytes of group transport overhead is shown in FIG. 7 and described below as follows:

Framing Bytes: Two framing bytes or frame alignment signals are provided by the frame formatter. These bytes correspond to the STS-1 A1 and A2 bytes.

Link Trace: A link trace is used to repetitively transmit a 64 Kbit fixed linked string so a receiving terminal can continuously verify the integrity of a path. The contents of the message are user programmable and are provided by the frame formatter. This byte corresponds to the STS-1 J1 byte.

Multiframe Indicator: A multi-frame indicator is provided for payloads needing frames that are longer than a single optical extension frame. The multi-frame indicator is also provided by the frame formatter. This byte corresponds to the STS-1 H4 byte.

Orderwire: A 64 kbit/s PCM voice channel for line level order wire. The contents of this byte would typically be provided by a router which would take the contents of the corresponding SONET orderwire byte and provide the contents to the formatter for allocation to the optical extension format overhead. This byte corresponds to the STS-1 E1 byte.

User Channel: A 64 kbit/s channel which is set aside for user purposes. The contents of this channel would also be provided from the corresponding SONET STS-1 byte to the frame formatter via a router. This byte corresponds to the STS-1 F1 byte.

DCC: A 192 kbit/s data communications channel (DCC) is provided by three bytes for alarms, maintenance, control, and administration between sections. This data is provided from the STS frame via a router. These bytes correspond to the STS-1 D1–D3 bytes.

Bit Interleaved Parity: A bit-interleaved parity for error-monitoring. The contents of this byte are computed by the frame formatter. This byte corresponds to the STS-1 B2 byte.

APS: Two bytes allocated for signaling between automatic protection switching equipment on the optical extension. The contents of these bytes are provided by the frame formatter. These bytes correspond to the STS-1 K1 and K2 bytes.

SYNC: A synchronization byte is provided from the STS-1 frame via a router. This byte corresponds to the STS-1 Z1 byte.

Signal Label: A byte allocated for signal label to provide an indication of the construction of the STS-1 SPE. This byte is provided from the STS-1 frame via a router. This byte corresponds to the STS-1 C1 byte.

Path Status: A status byte sent from path terminating equipment back to path originating equipment to convey the status of terminating equipment and path error performance. This byte allows the status and performance of the complete duplex path to be monitored at either end or at any point along the path. This byte is generated by the frame formatter and corresponds to the STS-1 G1 byte.

The remaining group transport overhead bytes are allocated for future use for as yet undefined purposes.

The line rate (LR) of the optical extension frame is one-sixth of the line rate of an STS-1 frame as given in equation 1 below:

$$LR=(135 \text{ bytes/Frame})(8 \text{ bits/byte})(8 \text{ kHz})=8,640 \text{ kHz/Frame} \quad \text{eq. 1}$$

Alternatively, the line rate may be determined using either equation 2 or 3 below:

$$LR=(27 \text{ bytes/row})(5 \text{ row})(8 \text{ bits/byte})(8 \text{ kbit/s})= 8640 \text{ kHz} \quad \text{eq. 2}$$

$$LR=(51,840 \text{ Mbit/s})/(6)=8640 \text{ kHz} \quad \text{eq. 3}$$

As discussed hereinabove with respect to the DMI 170 (FIG. 3) the line rate of 8.640 MHZ is provided by the clock 315 (FIG. 5) which divides the STS-1 group line rate by six. This line rate is provided to the frame formatter via the VTG bus 140.

Referring again to FIG. 4, a Slave OEI 180 is provided at an end of the optical extension 178 remote from the ADM 110. The Slave OEI 180 is interconnected to a VTG bus interface 145a via a VTG bus 140a and provides the identical functions as an OEI 172 (FIG. 3) contained within the ADM 110. The Slave OEI 180 performs VT group to optical extension format mapping in the MUX direction towards the ADM 110 and optical extension format to VT group mapping in the DEMUX direction towards the VTG bus interface 145a. As described herein above, the VTG bus interface 145a supports up to four (4) DS-1 circuits 156a.

Although the invention has been described and illustrated with respect to exemplary embodiments thereof, it should be understood by those skilled in the art that the foregoing and various other changes, omissions, and additions thereto may be made therein and thereto without departing from the spirit and scope of the present invention.

What is claimed is:

1. A VT group optical extension formatting method for positioning data to be transferred in a bit stream, comprising the steps of:

arranging the data to be transferred in a transport frame comprising a transport overhead portion and a payload portion;

placing data indicative of information to be conveyed in said payload portion, said data comprising one VT group of an STS-N frame, wherein N is an integer greater than or equal to one (1); and placing data indicative of control information in said overhead portion, said control information being related to said information to be conveyed within said payload portion.

2. A VT group optical extension formatting method according to claim 1 wherein said transport frame is comprised of 135 bytes, wherein said transport overhead portion is comprised of 27 bytes and defines operations, administration and maintenance functions and wherein said payload portion is comprised of 108 bytes.

3. A VT group optical extension formatting method according to claim 2 further comprising the steps of:

determining a line rate as an integer multiple (i) of an STS-N network element clock, wherein N is an integer greater than or equal to one (1); and transporting the transport frame in the bit stream at said line rate.

4. A VT group optical extension formatting method according to claim 3 wherein i is 6 if N is 1 and i is 18 if N is 3.

5. A VT group optical extension formatting method according to claim 3 wherein said line rate is 8.640 Mbit/S.

6. A VT group optical extension formatting method according to claim 1 further comprising the step of transporting the transport frame in the bit stream at a line rate of 8.640 Mbit/S.

7. A VT group optical extension formatting method according to claim 1 further comprising the steps of:

determining a line rate as an integer multiple (i) of an STS-N network element clock, wherein N is an integer greater than or equal to one (1); and transporting the transport frame in the bit stream at said line rate.

8. A VT group optical extension formatting method according to claim 7 wherein i is 6 if N is 1 and i is 18 if N is 3.

9. A VT group optical extension formatting method according to claim 7 wherein said line rate is 8.640 Mbit/S.

10. An optical extension interface for transferring data between an optical extension and a VTG bus comprising:

formatter means responsive to the provision of a multiplexed VT group payload provided on the VTG bus for providing a corresponding VT group optical extension transport frame on the optical extension, said VT group payload comprising data to be transported including data indicative of information to be conveyed and data indicative of control information, said formatter means including:
  a) means tier providing said VT group optical extension transport frame comprising a transport overhead portion and a payload portion;
  b) means for placing data indicative of information to be conveyed in said payload portion, said data comprising one VT group of an STS-N frame, wherein N is an integer greater than or equal to one (1); and
  c) means for placing data indicative of control information in said overhead portion, said control information being related to said information to be conveyed within said payload portion; and optical interface means between said formatter means and the optical extension.

11. An optical extension interface according to claim 10 wherein said formatter means is further responsive to the provision of a VT group optical extension transport frame on the optical extension for providing a multiplexed VT group payload to the VTG bus.

12. An optical extension interface according to claim 11 wherein said optical interface means includes electrical transmit means for converting an electrical VT group optical extension transport frame received from said formatter means into an optical VT group optical extension transport frame for provision to the optical extension, and electrical receive means for converting an optical VT group optical extension transport frame received from the optical extension into an electrical VT group optical extension transport frame for provision to said formatter means.

13. An optical extension interface according to claim 11 wherein said transport frame is comprised of 135 bytes, wherein said transport overhead portion is comprised of 27 bytes and defines operations, administration and maintenance functions and wherein said payload portion is comprised of 108 bytes.

14. An optical extension interface according to claim 11 further comprising means for providing said transport frame to, and receiving said transport frame from, the optical extension at a line rate of 8.640 Mbit/S.

15. An optical extension interface according to claim 11 further comprising:

means for determining an optical extension line rate as an integer multiple (i) of an STS-N network element clock, wherein N is an integer greater than or equal to one (1); and means for providing said transport frame to, and receiving said transport frame from, the optical extension at said line rate.

16. An optical extension interface according to claim 15 wherein i is 6 if N is 1 and i is 18 if N is 3.

17. An optical extension interface according to claim 15 wherein said line rate is 8.640 Mbit/S.

18. An optical extension interface according to claim 15 wherein said means for determining is a drop module interface.

19. An optical extension interface according to claim 11 wherein certain of said control information corresponds to said VTG payload and the remainder of said control information is generated by said formatter means.

* * * * *

UNITED STATES PATENT AND TRADEMARK OFFICE
CERTIFICATE OF CORRECTION

PATENT NO. : 5,490,142
DATED : February 6, 1996
INVENTOR(S) : C. Hurlocker

It is certified that error appears in the above-indentified patent and that said Letters Patent is hereby corrected as shown below:

At column 9, line 33 (line 11 of claim 10), please change "tier" to --for--.

Signed and Sealed this

Fourteenth Day of May, 1996

Attest:

BRUCE LEHMAN

*Attesting Officer*    *Commissioner of Patents and Trademarks*